June 5, 1928.
F. G. FOLBERTH ET AL
1,672,154
WINDSHIELD CLEANER
Filed Oct. 25, 1924  2 Sheets-Sheet 1
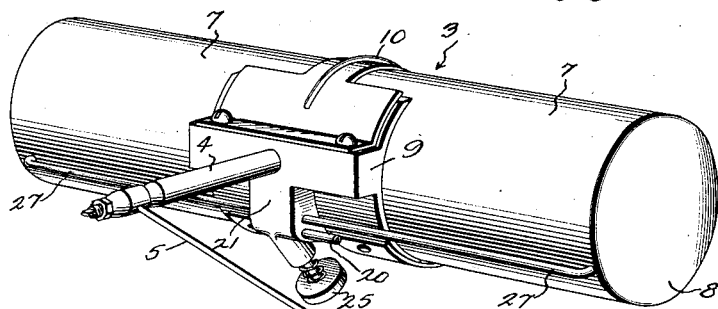
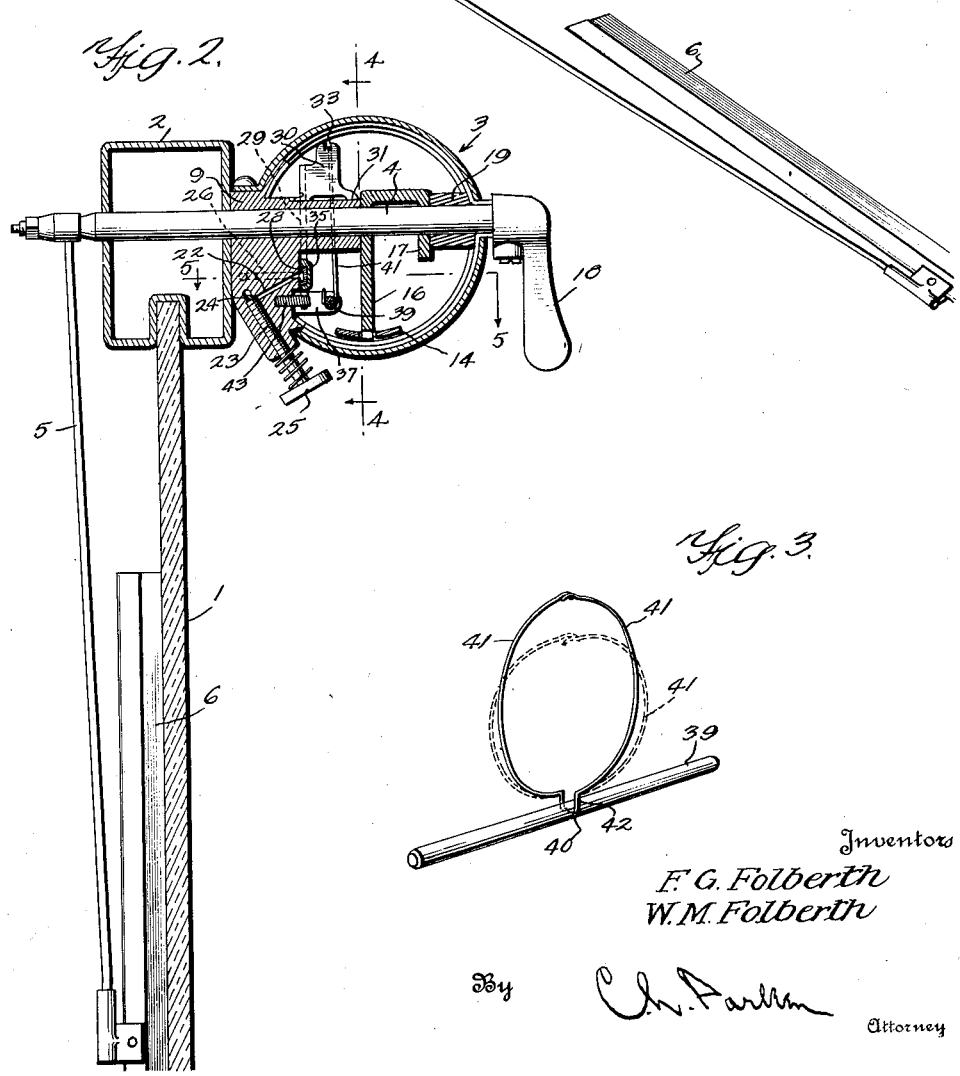
Inventors
F. G. Folberth
W. M. Folberth
By Chs. Parker
Attorney June 5, 1928.
F. G. FOLBERTH ET AL
WINDSHIELD CLEANER
Filed Oct. 25, 1924   2 Sheets-Sheet 2
1,672,154
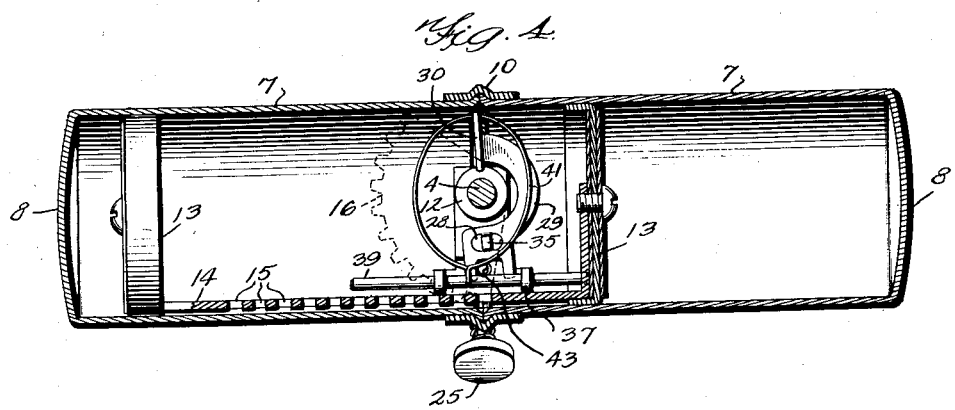
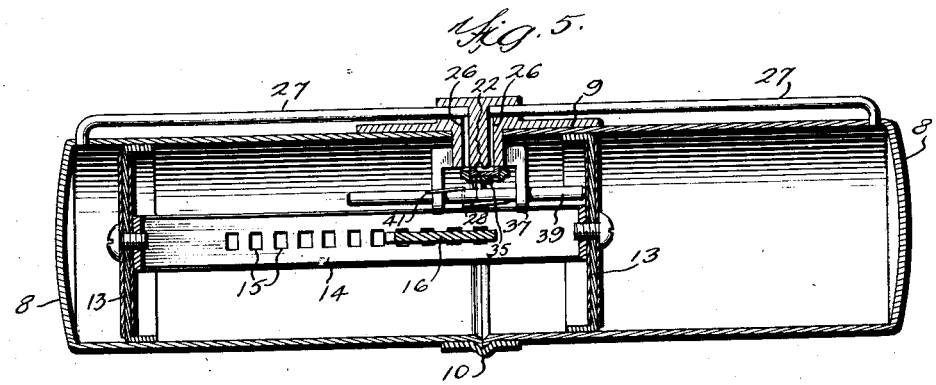
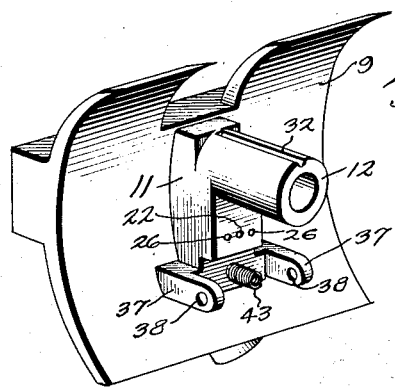
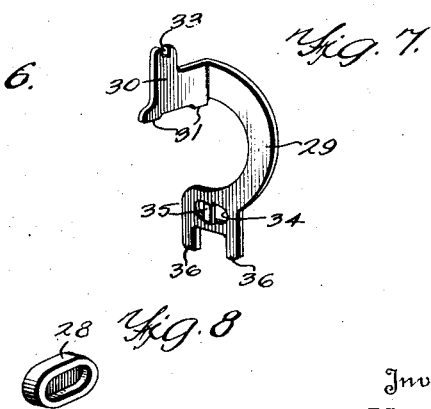
Inventors
F. G. Folberth
W. M. Folberth
By
Attorney Patented June 5, 1928.

1,672,154

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed October 25, 1924. Serial No. 745,887.

This invention relates to windshield cleaners, and more particularly to valve actuating mechanism for the motors of windshield cleaners.

An object of the invention is the provision of a simplified construction of valve actuating mechanism by means of which the valve is shifted at the end of each stroke to alternately place the opposite ends of the cylinder in communication with the source of suction.

A further object is the provision of a substantially circular spring which is maintained under tension and which is adapted to move the valve supporting member to opposite sides of its pivot.

A further object is the provision of improved means for securing the valve to the valve supporting member.

In the accompanying drawings, we have shown one embodiment of the invention. In this showing:

Figure 1 is a perspective view,

Figure 2 is a vertical sectional view showing the cleaner in position on a windshield, Figure 3 is a detail view of a portion of the valve shifting mechanism, Figure 4 is a vertical sectional view on line 4—4 of Figure 2, Figure 5 is horizontal sectional view on line 5—5 of Figure 2, Figure 6 is a perspective view of a closure plate, Figure 7 is a similar view of the valve supporting lever, and, Figure 8 is similar view of the valve.

Referring to the drawings, the reference numeral 1 designates a windshield formed of glass or other transparent material, and mounted in a suitable frame 2. The windshield cleaner comprises a motor consisting of a cylinder 3, mounted on the windshield frame and provided with a transverse shaft 4. This shaft is adapted to receive a cleaner arm 5 having a cleaner element 6 mounted on its lower end and the cleaner element is adapted to contact with a portion of the windshield to be cleaned.

The cylinder 3 is formed of a pair of sections 7 which are sustantially cup-shaped and provided with closed ends 8 forming the heads of the cylinder. A closure plate 9 which is curved in cross section, is arranged adjacent the center of the cylinder, where the two sections abut each other, and a clamping band 10 is secured to this closure plate and extends around the meeting edges of the cylinder sections. The closure plate is provided with an internal enlargement 11 and a sleeve 12 extends inwardly from the face of this enlargement. A pair of pistons 13 are mounted in the cylinder and spaced from each other. These pistons are connected to each other by a connecting member 14, having spaced openings 15 formed therein, forming a rack. A segmental gear 16 is arranged on the shaft 4 and meshes with the rack 15. As shown, the gear extends over the shaft parallel thereto and is provided with a depending portion 17, having an opening for the reception of the shaft and forming a double bearing. The shaft extends from the inner side of the cylinder and is provided with a handle 18, to permit manual operation. A collar 19 is arranged on the shaft between the wall of the cylinder and the depending portions 17 of the segmental gear to properly space the various parts of the motor.

Suitable means are provided for connecting the opposite ends of the cylinder to a source of suction or pressure. As shown, a tube 20 is arranged in a passage in a T-shaped enlargement 21 formed on the exterior of the closure plate. This tube is adapted to be connected to a source of suction or pressure, such as the intake manifold of an internal combustion engine (not shown) by means of a conduit (not shown). The passage connected to the tube 20 is also connected at its inner end to a suction passage 22 which extends inwardly to the inner face of the enlargement 11 (see Figure 6). The T-shaped enlargement is provided with a threaded bore adapted to receive a valve stem 23, having a valve 24 on its inner end which is adapted to close the end of the suction passage 22. As shown, the valve stem is provided with a handle 25 to permit manual operation. On each side of the suction passage 22, there is provided a cylinder passage 26 (see Figure 5), and the outer ends of these passages are connected to tubes or conduits 27 which communicate with the opposite ends of the cylinder.

The suction passage 22 is adapted to be connected to either of the cylinder passages 26 by means of a shiftable valve. As shown, the valve 28 is substantially cup-shaped and is adapted to bridge over the space between the suction passage and one of the cylinder passages. In order to reduce the amount of material employed in making the valve, and to reduce the amount of contact between the valve and the face of the enlargement, the valve may be made oval-shaped as shown instead of circular. This valve is adapted to be supported by a valve supporting lever which is pivotally mounted in a plane parallel to the face of the enlargement 11. As shown, the valve supporting member consists of a substantially semi-circular body portion 29 to fit around the sleeve 12. The upper end of this member is extended at right angles, as at 30, and is provided with a pair of depending fingers 31, adapted to be received in the groove 32 in the top of the sleeve to pivotally support it. The extension 30 is also provided with a notch 33 in its upper end to receive the operating spring. The lower portion of the valve supporting member is provided with a cut-out portion 34 of the same size and shape as the valve and the piece of metal 35 extends across the cut-out portion centrally thereof to retain the valve in position. The lower end is provided with a pair of depending arms 36.

The lower end of the enlargement is provided with a pair of projecting arms 37, having alined openings 38. A rod 39 is slidably mounted in these openings and this rod is provided with a groove or notch 40. A substantially circular spring 41 is secured to the rod, the spring being provided with an offset stirrup portion 42 adapted to be received in the groove 40. As shown, the upper end of the spring is received in the notch 33 in the top of the valve supporting lever. A coil spring 43 is arranged on the face of the enlargement and is adapted to be engaged by the depending arms 36.

The operation of the device is as follows:

In Figures 4 and 5 of the drawings, the pistons have just completed a movement toward the left end of the cylinder and the valve has been shifted to place the right end of the cylinder in communication with a source of suction, the cylinder passage 26 from the left end of the cylinder, having been uncovered by said valve, now opening directly into the space between the pistons 13. Atmospheric pressure obtains in this space between said pistons by entering through the unpacked joint between said cylinder sections 7 as well as about the inner end of shaft 4. The normal position of the spring 41 is shown in dotted lines in Figure 3 of the drawings and when the upper end of the spring is arranged in the notch 33, the spring assumes the full line position and is placed under tension. With the parts in the position shown in Figure 4 of the drawings, the pistons move toward the right end and as the end of the stroke is approached, the left piston will engage the left end of the rod 39, sliding it in the openings 38. When the lower end of the spring 41 passes the center of the pivot of the valve supporting member, the upper end of the valve supporting member will be moved toward the right and the valve supporting member will swing on its pivot to move the valve to the left to cover the suction passage 22 and the cylinder passage 26 to the left, thus connecting the left end of the cylinder to the source of suction. The movement of the valve is limited by the spring 43 which is engaged by one of the arms 36 each time the valve is shifted. This movement of the valve from one position to the other takes place at the end of each stroke, the spring 41 moving the upper end of the valve supporting member and thus swinging the valve supporting member on its pivot. The spring 41 being circular, and being distended radially or in the plane of the circular spring body, has its line of spring force or its line of maximum force lying substantially in the plane of the spring body. It is therefore this line of spring or maximum force which is moved across dead center or across the pivotal mounting of the lever 29. Being distended from the normally untensioned and substantially circular formation indicated by the dotted showing in Fig. 3, to the more or less elliptical and solid line showing in this figure, the spring exerts downward force on the upper end portion 30 of the lever 29 so as to firmly hold it on its fulcrum support, and as the line of spring force or maximum force is moved back and forth to opposite sides of the pivotal mounting of the lever, said upper end 30 is rocked back and forth in the groove 32. The spring 41 is herein depicted as being substantially circular in shape and is so described for the sake of clearness although it is intended to include any particular shape for an open spring of this nature wherein the line of spring force or maximum force is substantially radially or in the plane of the spring body. In forming the spring from a length of wire the ends or terminals are brought together in slightly overlapping relation as shown in Fig. 3, and these ends are hooked or engaged in the notch 33 so as to maintain the shape of the spring body.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. Valve actuating mechanism for windshield cleaners, comprising a movable member adapted to be actuated by a movable element of the motor, a substantially circular spring hung over a part of said movable member, a valve, and a valve supporting member pivoted for limited movement and having a part about which said circular spring is hung under tension, said spring being distended radially from its circular shape when engaged over said parts and having its line of spring force movable by said movable member to opposite sides of the pivotal mounting of said valve supporting member.

2. Valve actuating mechanism for windshield cleaners, comprising a pivoted valve supporting member movable from one to the other of two positions, a valve connected to said member on one side of its pivot, a substantially circular spring connected to said member on the other side of its pivot, and a slidable member spaced from said point of connection of said spring a distance greater than the normal diameter of the spring, said spring being tensionally distended radially to engage and be held so distended by said slidable member, said slidable member being actuated by a movable part of the motor to shift the line of spring force of said radially tensioned circular spring to opposite sides of said supporting member whereby the spring will snap said supporting member from one to the other of said positions.

3. Valve actuating mechanism for windshield cleaners comprising a pivoted valve supporting member movable from one to the other of two positions, a valve connected to said member on one side of its pivot, a substantially circular spring connected to said member on the other side of its pivot, and a rod extending longitudinally of the motor casing and having a notch in which said spring is tensionally engaged through radial distention thereof, said rod being adapted to be engaged by a movable part of the motor to move said rod and thereby shift the line of spring force of said circular spring to the opposite side of the pivotal mounting of said supporting member for effecting a quick snap action of the latter from one to the other of said positions.

4. Valve actuating mechanism for windshield cleaners comprising a pivoted valve supporting member movable from one to the other of two positions, a valve connected to said member on one side of its pivot, a substantially circular spring connected on one side to said member on the opposite side of its pivot and having its opposite side offset to form a stirrup, and a slidable member engaged in said stirrup, said spring being radially distended under tension to effect such engagement, said slidable member being adapted to be actuated by a movable part of the motor for shifting the line of maximum force of said circular spring to opposite sides of the pivotal mounting of said supporting member for effecting a quick movement of the latter from one to the other of said positions.

5. Valve actuating mechanism for windshield cleaners comprising a pivoted valve supporting member having an upstanding part, a valve connected to said member on one side of its pivot, a substantially circular spring having overlapping end portions bearing on said upstanding part, said spring being formed with a stirrup opposite said overlapping ends, and a rod engaged in said stirrup and tensionally holding the spring radially distended, said rod extending longitudinally of the motor casing and being adapted to be engaged by a movable part of the motor to move said rod and actuate said valve.

6. In a windshield cleaner motor, automatic valve mechanism including a valve, a pivoted valve supporting member having spaced arms, means for actuating said valve supporting member to cause said valve to assume either of two positions, and a coil spring arranged between said arms with its axis extending across the path of said valve supporting member for being engaged by said arms to limit the movement of said valve supporting member and said valve.

7. In a windshield cleaner motor, automatic valve mechanism including a valve, a pivoted valve supporting member provided with a pair of spaced arms, means for actuating said valve supporting member to cause said valve to assume either of two positions, and a coil spring arranged between said arms to be alternately engaged thereby to limit the movement of said valve in either direction.

8. In a windshield cleaner motor, a casing having an inwardly extending bearing sleeve formed with an exterior longitudinal groove opening through the inner end wall of said sleeve, a valve, a valve actuating lever pivoted in the groove of said sleeve, a cleaner shaft journaled in the sleeve and projecting from the inner end of the same, a member fixed on the shaft adjacent the inner end of said sleeve and extending across the open end of the groove for holding the lever against displacement from the open end of the groove, a piston in the casing for operating said member to actuate said shaft, and means operable by and during movement of the piston for operatively moving said valve actuating lever.

9. In a windshield cleaner motor, a casing part having a bearing sleeve, a valve actuating lever having a bearing edge extending lengthwise of said sleeve and pivoting on one side of the sleeve lengthwise thereof, said lever extending about said sleeve to the opposite side thereof, a valve on said opposite side of the sleeve operable by said lever from one to the other of two positions, a spring for operating the lever and holding it in position on said sleeve, and a positioning member for said spring operable from a movable part of the motor for moving the line of spring force back and forth across a dead center position relative to the pivotal mounting of the lever whereby said spring will quickly rock the lever to move the valve from one position to its other position.

10. In a windshield cleaner motor, a casing member having a projecting bearing sleeve and a projecting pair of opposed parts, said parts and said sleeve being relatively superposed, a shaft journaled in the sleeve, a piston operable in the casing member for rocking the shaft, a valve for operatively admitting fluid pressure to the casing member, a valve actuating lever pivoted on said sleeve and having a movement limiting portion operating between said opposed parts, means cooperating with said portion for limiting the movement of said lever, a spring connected to said lever and adapted to have its line of maximum force shifted back and forth to opposite sides of said lever pivot, and a spring positioning member slidably guided by said opposed parts and movable by a movable part of the motor for shifting the line of maximum force of said spring.

In testimony whereof, we affix our signatures.

FREDERICK G. FOLBERTH.
WILLIAM M. FOLBERTH.